(12) United States Patent
Ramakrishnaraja et al.

(10) Patent No.: US 11,461,721 B2
(45) Date of Patent: Oct. 4, 2022

(54) METHOD AND SYSTEM FOR MANAGING A TECHNICAL INSTALLATION

(71) Applicants:Prithvi Raj Ramakrishnaraja, Secundrabad (IN); Vineet Kamboj, Haryana (IN); Siddharth Mehrotra, Uttar Pradesh (IN)

(72) Inventors: Prithvi Raj Ramakrishnaraja, Secundrabad (IN); Vineet Kamboj, Haryana (IN); Siddharth Mehrotra, Uttar Pradesh (IN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/046,443

(22) PCT Filed: Apr. 10, 2019

(86) PCT No.: PCT/EP2019/059011
§ 371 (c)(1),
(2) Date: Oct. 9, 2020

(87) PCT Pub. No.: WO2019/197434
PCT Pub. Date: Oct. 17, 2019

(65) Prior Publication Data
US 2021/0248525 A1 Aug. 12, 2021

(30) Foreign Application Priority Data
Apr. 10, 2018 (EP) .................................... 18166571

(51) Int. Cl.
*G06Q 10/06* (2012.01)
(52) U.S. Cl.
CPC ... *G06Q 10/0633* (2013.01); *G06Q 10/06316* (2013.01); *G06Q 10/06395* (2013.01); *G06Q 10/063114* (2013.01)

(58) Field of Classification Search
CPC ....... G06Q 10/0633; G06Q 10/063114; G06Q 10/06316; G06Q 10/06395
See application file for complete search history.

(56) References Cited

U.S. PATENT DOCUMENTS 8,676,721 B2 * 3/2014 Piovesan ................ G06Q 10/00
706/11
10,088,839 B2 * 10/2018 Saravanapriyan .... F01D 21/003
(Continued)

FOREIGN PATENT DOCUMENTS

| CN | 104049582 A | 9/2014 |
| CN | 104049593 A | 9/2014 |

(Continued)

OTHER PUBLICATIONS

2017 New Commercial Products. (2017). Air Conditioning, Heating & Refrigeration News, 262(5), 9(24). Retrieved from https://dialog.proquest.com/professional/docview/1966456015?accountid=131444 (Year: 2017).*

(Continued)

*Primary Examiner* — Patricia H Munson
*Assistant Examiner* — Hamzeh Obaid
(74) *Attorney, Agent, or Firm* — Lempia Summerfield Katz LLC

(57) ABSTRACT

A method and system for managing a technical installation are disclosed. An event associated with at least a portion of the technical installation is detected based on sensor data associated with the portion of the technical installation. A representative view of the portion of the technical installation is rendered on at least one wearable device. The representative view displays information associated with the detected event in conjunction with the multi-dimensional view of the portion of the technical installation. A predictive time series analysis of the sensor data associated with the detected event is generated. The predictive time series (Continued)

analysis in conjunction with the representative view of the at least one portion of the technical installation is displayed.

17 Claims, 9 Drawing Sheets

(56) References Cited

U.S. PATENT DOCUMENTS

| | | | |
|---|---|---|---|
| 2013/0173218 A1 | 7/2013 | Maeda | |
| 2013/0197899 A1* | 8/2013 | Roulland | G06F 11/0733 704/9 |
| 2015/0170090 A1* | 6/2015 | Bose | G06Q 10/06395 705/7.41 |
| 2015/0316907 A1 | 11/2015 | Elbsat | |
| 2018/0113773 A1* | 4/2018 | Krishnan | G06F 11/008 |
| 2018/0267523 A1 | 9/2018 | Sigtermans et al. | |
| 2020/0041988 A1* | 2/2020 | Natsumeda | G05B 23/024 |

FOREIGN PATENT DOCUMENTS

| | | | | |
|---|---|---|---|---|
| CN | 104142630 A | 11/2014 | | |
| CN | 106066633 A | 11/2016 | | |
| CN | 107272634 A | 10/2017 | | |
| DE | 102010001776 A1 * | 8/2011 | ......... | G05B 23/0278 |
| EP | 2884363 B1 | 10/2019 | | |
| GB | 2513238 A | 10/2014 | | |

OTHER PUBLICATIONS

Bhattacharya, S. (2009). Impact of the ISM code on the management of occupational health and safety in the maritime industry (Order No. U585212). Retrieved from https://dialog.proquest.com/professional/docview/1373244892?acco (Year: 2009).*
International Preliminary Reporton Patentability for International Patent Application PCT/EP2019/059011 dated Oct. 22, 2020.
European Search Report for European Patent Application 18166571.2-1204 dated Oct. 11, 2018.
International Search Report and the Written Opinion for International Patent Application PCT/EP2019/059011 dated Jun. 12, 2019.
Chinese Office Action for Chinese Application No. 201980038663.3 dated Jun. 22, 2021.

* cited by examiner

METHOD AND SYSTEM FOR MANAGING A TECHNICAL INSTALLATION

CROSS REFERENCE TO RELATED APPLICATIONS

This present patent document is a § 371 nationalization of PCT Application Serial Number PCT/EP2019/059011 filed Apr. 10, 2019, designating the United States, which is hereby incorporated in its entirety by reference. This patent document also claims the benefit of EP 18166571.2 filed on Apr. 10, 2018 which is also hereby incorporated in its entirety by reference.

FIELD

Embodiments relate to a method and system for managing a technical installation.

BACKGROUND

Situational awareness is cognizance of environmental elements and events with respect to time or space. The cognizance involves comprehending the elements and the events and projecting the status of such elements and events when a variable affecting the elements or the events is changed. Technical installations may be remotely located, for example offshore locations, sea-beds, and deserts. Technical installations may involve several complex workflows for its operation. Multiple events may occur at a given point in time on the technical installation, that require immediate attention of at least one entity. Identification of the cause of an anomaly in complex technical installation is of utmost importance. The identification may involve several aspects such as detection of the problem, detection of the portion in the technical installation where the anomaly has occurred and comprehending the anomaly and the cause of the anomaly. However, factors such as distance of the entity from the location of the event or occurrence of more than one event at the same time increases the difficulty identifying the anomaly. This makes the process of maintaining a technical installation cumbersome. European Patent Application EP 2884363 A2 discloses an anomaly detecting method and apparatus that excludes any anomaly data found in learned data in order to set a proper threshold for anomaly detection based on a model using multi-dimensional time series sensor signals. However, this document fails to disclose a method to resolve anomalies by identifying one or more appropriate mitigation actions. Failure to resolve the pending events may lead to catastrophic accidents, thereby causing loss of life and property. Furthermore, determination of an appropriate mitigation action for the anomaly is also challenging in maintenance of the technical installation. Implementation of an unsuitable mitigation action may lead to failure of the technical installation and permanent damage to multiple portions of the installation. Therefore, it is essential to accurately detect, comprehend, and project events that occur in the installation such that an accurate decision to mitigate the anomaly is made.

In the light of the above, there exists a need to provide a method and system for managing a technical installation that is configured to detect, comprehend and project the anomaly and the mitigation actions.

SUMMARY

The scope of the present invention is defined solely by the appended claims and is not affected to any degree by the statements within this summary. The present embodiments may obviate one or more of the drawbacks or limitations in the related art.

Embodiments provide a method and a system for managing a technical installation that supports human cognition efficiently and accurately.

Embodiments provide a method of managing a technical installation, a system, and a computer program product that generates a predictive time series analysis of the sensor data to manage the technical installation.

Embodiments generate a predictive time series analysis of the sensor data associated with the detected event and displaying the predictive time series analysis in conjunction with representative view of the at least one portion of the technical installation. An advantage is that the method provides quick access to necessary data pertaining to the anomalous portion of the technical installation. Another advantage is that the predictive time series analysis information is provided in conjunction with representative view of the portion of the technical installation, thereby amplifying the perception of the anomaly thus providing an efficient decision-making process.

Embodiments provide a method of managing a technical installation. The method includes a step of detecting an event associated with a portion of the technical installation based on sensor data associated with the portion of the technical installation. One or more sensors may be disposed in at least a portion of the technical installation. The one or more sensors may be configured to receive one or more values associated with the technical installation that may correspond to the functioning of the technical installation. The values may be related to one or more parameters, for example, but not limited to pressure, temperature, flow, and control. The parameters are monitored to determine the functioning of the technical installation. Based on the parameter values obtained from the sensors, an event may be detected in the portion of the technical installation. The event may be, for example, an anomaly or abnormality in the working of the technical installation. The method also includes a step of rendering a representative view of the portion of the technical installation on a wearable device. The representative view may display information associated with the detected event in conjunction with the multi-dimensional view of the portion of the technical installation. According to an embodiment, the representative view may be, for example a holographic view. A hologram is a photographic recording of a light field that is used to display a multi-dimensional image of the holographed subject. In an embodiment, a hologram of the portion of the technical installation is generated using methods well-known in the art. The holographic view of the portion of the technical installation is coupled with information pertaining to the detected event. For example, if a unit in the portion of the technical installation is malfunctioning, information related to the malfunctioning unit may be overlaid on the multi-dimensional view of the technical installation. The information may be, for example, one or more parameters associated with the functioning of the unit in the technical installation. The values for each of the parameters may be displayed in conjunction with the holographic view of the portion of the technical installation. This provides an entity to determine the cause of the malfunction of the unit. In another embodiment, the malfunctioning unit may be indicated, for example, with a different color or as a hologram in motion. The hologram in motion may for example be a pulsating motion such that the malfunctioning unit of the technical installation appears to pulsate. The advantage of rendering a holographic view is that the detected event in the portion of the technical installation may be located easily. This provides identification of the malfunctioning unit within the technical installation efficiently.

The method further includes a step of generating a predictive time series analysis of the sensor data associated with the detected event. A predictive time series analysis refers to determination of how an event would progress over a period of time. Sensor data refers to data associated with the technical installation and may include values associated with one or more parameters related to the functioning of the technical installation. The predictive analysis is based on a time series analysis. The values associated with the parameters of the unit include a threshold. The threshold determines the permissible limits within which the values of the parameters may lie for effective functioning of the unit of the technical installation. A predictive model divides the limits based on time to produce a predictive time series analysis based on the sensor data associated with the detected event. The predictive time series analysis provides for the entity to determine how the event might progress over a period of time. Predictive time series analysis also allows the entity to identify how quickly the anomaly has to be mitigated. Advantageously, predictive time series analysis provides for prevention of a catastrophic disaster in the technical installation. The method further includes a step of displaying the predictive time series analysis in conjunction with the representative view of the at least one portion of the technical installation. The predictive time series analysis and the representative view of the technical installation may be displayed, for example, on the display unit of the wearable device of the entity. The predictive time series analysis may be displayed, for example, as a hologram. The predictive time series analysis along with the representative view of the technical installation provides for creation of situational awareness on the technical installation. Therefore, the entity is cognizant of events that may take place in the technical installation. Thus, embodiments provide for the entity to take quick and informed decisions to maintain the technical installation. Yet another advantage is that the entity receives information about the technical installation on-the-go. The need to navigate to a certain location to identify an issue and obtain more data on the detected event is eliminated.

According to an embodiment, the method further includes performing at least one mitigation action to address the detected event in the portion of the technical installation based on the predictive time series analysis. A mitigation action is a step, or a process implemented to reduce or eradicate risk to human life and property from one or more events. Based on the predictive time series analysis, one or more mitigation actions may be identified and performed so as to address the detected event. The advantage is that the detected event is resolved by implementation of at least one mitigation action. The performance of the mitigation action provides prevention of catastrophic disasters in the technical installation, thereby maintaining safety of life and property. Yet another advantage is that performance of mitigation action provides for effective and efficient maintenance of the technical installation. Therefore, breakdown of the technical installation may be avoided and reduced.

According to an embodiment, in detecting the event in the portion of the technical installation, the method includes receiving sensor data from one or more sensor units disposed in the technical installation. The sensor data is associated with the at least one portion of the technical installation. The sensor units disposed in the technical installation are configured to capture parameter values associated with the working of the technical installation. The sensor units may be, for example, sensors configured to detect pressure, temperature, flow, and control parameters associated with the technical installation. The method further includes analyzing the sensor data and detecting the event associated with the portion of the technical installation. The sensor data is analyzed to identify an anomaly in the functioning of the technical installation. The data pertaining to the technical installation is constantly monitored and a distortion in the parameter values is identified quickly.

According to an embodiment, in generating the predictive time series analysis, the method includes identifying one or more parameters associated with the functioning of the at least one portion of the technical installation. The parameters pertaining to the functioning of the technical installation may be, but not limited to, pressure, temperature, flow, and control. The method further includes identifying a threshold value for each of the one or more parameters. The threshold value determines the permissible limits within which the values of the parameters may lie for effective functioning of the unit of the technical installation. Real-time values of the one or more parameters are received from one or sensors that are disposed in the at least one portion of the technical installation. As the one or more units within the technical installation function, real-time values associated with the parameters are recorded by the one or more sensors. The real-time values may also be alternatively referred to as sensor data. Each of the values recorded include a time stamp. A time stamp provides clear identification of parameter values at a given point in time and provides determination of a time duration within which the detected event may have to be addressed and resolved. A predictive time series analysis is generated using the received values. The predictive time series analysis is associated with the detected event. The predictive time series analysis provides determination of how the detected event may progress over a period of time. The predictive time series analysis provides a comprehensive understanding on the time period available to mitigate the detected event. The predictive time series analysis provides cognition regarding gravity of the detected event.

According to an embodiment, generating the predictive time series analysis includes determining one or more probable estimate values of one or more parameters based on the real-time data received from one or more sensors disposed in the technical installation. The determination may be made using a prediction model. The prediction model may use the real-time parameter values to estimate how the values may change over a given period of time. The probable estimate values are distributed at regular intervals of time to generate a predictive time series analysis of the parameter values. A situational awareness associated with the at least one portion of the technical installation is created.

According to an embodiment, in performing the mitigation action to address the detected event, the method includes detecting an anomaly associated with the event based on the predictive time series analysis of the received values. The predictive time series analysis provides for identification of parameters that may deviate from a certain standard. Deviation of one or more parameters from the standard may indicate an event in the functioning of the technical installation. The detected event may be an anomaly in the functioning of the technical installation. The sensor data may provide information on the functioning of the portion of the technical installation. Based on the predictive analysis of the sensor data, any possible occurrence of an anomaly in the functioning of the technical installation may be detected. The predictive time series analysis provides for early detection of anomaly in the technical installation. The method further includes determining a mitigation action to resolve the detected anomaly. On detection of the anomaly in the functioning of the technical installation, it may be essential to determine one or more mitigation actions to resolve the detected anomaly. A mitigation action may be an action taken specific to the anomaly so as to reduce or eliminate risk to property and/or human life. The mitigation action is performed in the at least one portion of the technical installation so as to resolve the detected anomaly. The anomaly in the technical installation is detected early and therefore, the anomaly may be mitigated without causing loss to property and life. On detection of the anomaly, an appropriate mitigation action is determined and performed in the portion of the technical installation. Therefore, the entity is made aware of the mitigation actions available to resolve the detected anomaly. Thereafter, the mitigation action is also performed in the technical installation to rectify the detected anomaly.

According to an embodiment, in determining the mitigation action, the method includes analyzing an event log that may correspond to the at least one portion of the technical installation. The events occurring in the at least one portion of the technical installation may be recorded in the form of an event log. An event log may be a record of any occurrence in the technical installation that may be useful in understanding activities in the technical installation. The occurrences that may be recorded in the event log may include, but is not limited to errors, warnings, and informational messages. The event log may include a record of the time and date of occurrence of the event, type of event, source of the event and/or an event ID. Analysis of the event log provides determination of the nature and cause of the detected event. The event may be reconstructed based on the event log so as to determine the cause of malfunction in the portion of the technical installation. The events in an event log may be stored chronologically and may be replayed in the same order to reconstruct the event, for example, in the form of a process history. In an embodiment, the events may be reconstructed and represented on a map. For example, a map designer may be used to generate a map on which the event may be reconstructed. The map may be, for example, but not limited to, a Cartesian map, a timeline-based map, or a process model map. Based on the reconstructed event, one or more mitigation actions are identified. The one or more mitigation actions may have been performed previously in the technical installation to mitigate similar events. A most appropriate mitigation action may be determined from the one or more previously implemented mitigation actions, to resolve the detected event. Alternatively, if no previously implemented mitigation actions are identified for the detected event, a new mitigation action that may resolve the detected event may be determined by identifying steps that may be taken to overcome the anomaly and reduce the impact of the malfunction of the technical installation. Determination of the most appropriate mitigation action ensures effective maintenance of the technical installation. The most appropriate mitigation action may entail, for example, reduced risk of long-term damage to the technical installation, efficient working of the technical installation, and/or quicker resolution of the anomaly.

According to an embodiment, in determining the most appropriate mitigation action, the method includes generating a predictive time series analysis for each of the identified mitigation actions. Predictive time series analysis of each of the mitigation action may be generated using a prediction model. The prediction model may determine how one or more parameters essential for the functioning of at least one portion of the technical installation may change on implementation of the mitigation action. The outcome of each of the mitigation actions may be determined by analysis of the predictive time series data generated for each of the mitigation actions. The predictive time series analysis of the identified mitigation actions provides determination of possible repercussions of implementation of the mitigation action. There may be several approaches for resolving an anomaly. However, not all the approaches may be the best ones. For example, implementation of one of the mitigation actions may be dependent on efficient functioning of a unit in the technical installation. However, if the unit is non-functional or is under maintenance, implementation of the corresponding mitigation action may not resolve the anomaly detected in the technical installation. Implementation of the mitigation action may cause further damage to the technical installation. Therefore, determining the outcome of a mitigation action is essential so as to take an informed decision for resolving the anomaly. The mitigation action with the most appropriate outcome, in comparison with the outcomes of all the identified mitigation actions, is determined to resolve the anomaly in the technical installation. The determination of the most appropriate mitigation action provides efficient and quick resolution of the detected anomaly. Determination of the most appropriate mitigation action prevents expenditure of time in implementing actions that may not resolve the detected anomaly. Risk in implementing a certain mitigation action is identified before the implementation and therefore, loss to property and life is avoided. An informed decision process is enabled thereby creating effective situational awareness of the technical installation.

According to an embodiment, the method further includes establishing a communication channel between the at least one wearable device and the other wearable devices of the one or more entities associated with the technical installation. A communication channel is a mode or a transmission medium used for transfer of information between one or more entities, from one location to another. The communication channel established between the wearable devices provides transfer of information from one entity to another.

According to an embodiment, the method further includes identifying an appropriate escalation matrix associated with the detected anomaly. The escalation matrix may include at least one entity to be reported regarding the detected anomaly. The escalation matrix may be identified, for example, based on the one or more unit in the at least one portion of the technical installation where the anomaly is detected. Alternatively, the escalation matrix may also be identified based on the nature of the detected anomaly. The escalation matrix includes at least one entity that may be responsible for the maintenance and management of the technical installation. The at least one entity may also be a person that has an expertise in a domain corresponding to the at least one portion of the technical installation and is configured to resolve the detected anomaly in the technical installation. In an embodiment, the method further includes displaying the mitigation action and the corresponding escalation matrix on the wearable device. At least one entity associated with the wearable device may view the escalation matrix in conjunction with the mitigation actions. The at least one entity may further share the identified mitigation actions to the wearable device of the at least one entity included in the escalation matrix. Identification of the escalation matrix provides identification of one or more entities to be informed about the detected anomaly. Therefore, obtaining an expert view on the nature of the anomaly and on the mitigation action to resolve the anomaly is made possible. Identification of the escalation matrix and sharing the mitigation actions with the entity in the escalation matrix facilitates uniform information access across one or more relevant entities. This ensures efficient maintenance of the technical installation.

According to an embodiment, a conference session may be set up between the connected wearable devices via the communication channel. The conference session provides one or more entities associated with the connected wearable devices to interact with each other. The conference session may be, for example a telephonic call between the entities associated with the connected wearable devices. Therefore, the one or more entities may participate in the call either via voice and audio or only via audio. In an embodiment, the conference session may be secured by a security code or a personal identification number (PIN) such that only authorized entities may participate in the session. The conference session provides for participation of one or more entities present in different locations. Therefore, one or more entities may provide their inputs remotely. The conference session further saves time and effort to connect to more than one entity at the same time, thereby providing an interactive environment for effective resolution of issues.

According to an embodiment, the method further includes sharing the representative view and the predictive time series analysis of the portion of the technical installation with the connected wearable devices of the one or more entities via the communication channel and receiving an input from a first entity of the one or more entities through a user interface of the wearable device of the first entity. In an embodiment, the established communication channel may be configured to receive one or more inputs from one entity and transmit the input to one or more other entities. The transmission of one or more inputs may be performed in real-time. A user interface to receive inputs from the one or more entities may also be displayed on the display unit of the wearable device in conjunction with the multi-dimensional view and the predictive time series analysis. In an embodiment, one of the one or more entities may provide an input using the user interface. The input may generate additional content, such as a change in the multi-dimensional view of the technical installation. For example, an input from one of the entities may render a blown-up view of the technical installation such that one or more internal units of the technical installation may be visualized. The communication channel may receive the input from the entity and transmitting the input to the other entities in real-time to the connected wearable devices of the remaining entities. The method further includes receiving an input from a second entity of the one or more entities through the user interface of the wearable device of the second entity, in response to the input of the first entity. In an embodiment, the communication channel may be configured to receive and transmit input from only one entity at a given point in time. Therefore, clarity in the inputs from the entities is maintained.

According to an embodiment, the method includes generating an alert on the at least one wearable device when an event associated with the portion of the technical installation is detected. The alert may be generated as, for example, but not limited to, a notification on the display unit of the wearable device. The notification may be displayed on the display unit of the wearable device such that the notification occupies a major portion of the display area. The area occupied by the notification may be increased or decreased depending upon the criticality of the information to be conveyed. In an embodiment, the notification may be indicated on the display unit using a different color to draw the attention of the entity associated with the wearable device. In an embodiment, the notification may be generated in conjunction with a sound. In an embodiment, the alert may also include a pulse vibration in the wearable device, such that the wearable device vibrates in pulses when an alert is generated. The alert facilitates creation of situational awareness about the events occurring in different portions of the technical installation. Therefore, any event, critical or otherwise, may be addressed by the one or more entities such that efficient and quick resolution to the problem is achieved.

Embodiments provide a system for managing a technical installation. The system includes one or more processing units. In an embodiment, the system may include an interface configured to receive data from a technical database. The technical database may contain data related to one or more parameters associated with the at least one portion of the technical installation. In an embodiment, the technical database may be present in a cloud environment. The interface may be, for example, data bus that is configured to receive data from the technical database. The system further includes one or more memory units coupled to the processing units. The one or more memory units include a situational awareness-based management module that is configured to perform a method as described above.

Embodiments provide a system including one or more servers remotely located from a technical installation. The system further includes one or more sensors communicatively coupled to the one or more servers and one or more wearable devices communicatively coupled to the one or more servers. The one or more servers include computer readable instructions, that when executed by the one or more servers cause the one or more servers to perform the method as described above.

Embodiments provide a computer program product including a computer program, the computer program being loadable into a storage unit of a system, including machine readable instructions that when executed by a processing unit causes the processing unit to perform a method.

A computer program product and/or a computer-readable medium includes the advantage that already existing management systems may be easily adopted by software updates in order to function as proposed.

The computer program product may be, for example, a computer program or include another element apart from the computer program. This other element may be hardware, for example a memory device, on which the computer program is stored, a hardware key for using the computer program and the like, and/or software, for example a documentation or a software key for using the computer program.

DETAILED DESCRIPTION

Figure 1:
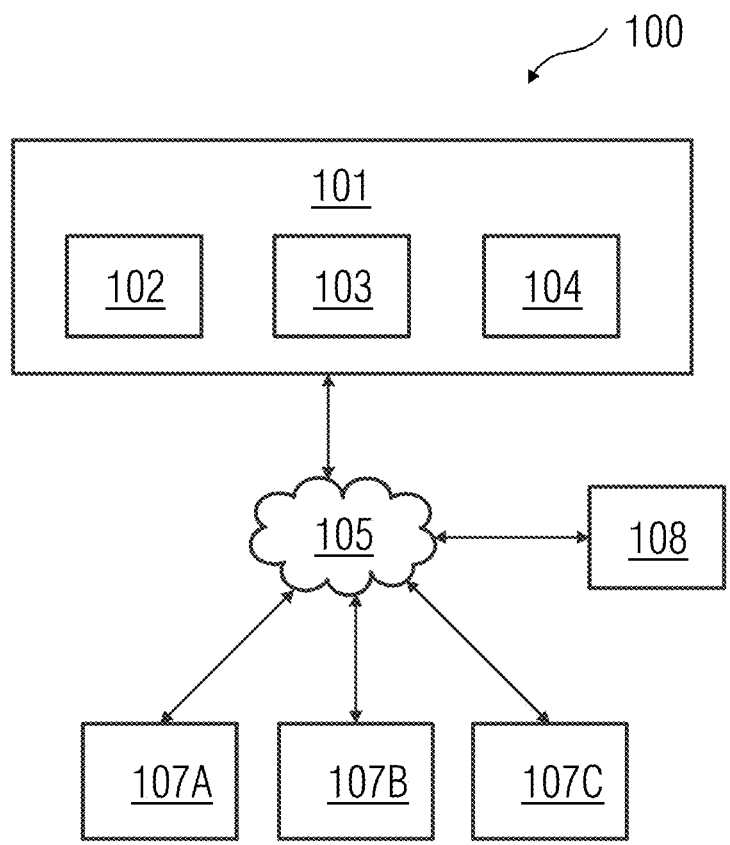
FIG. 1 depicts a block diagram of a client-server architecture that provides geometric modeling of components representing different parts of a real-world object, according to an embodiment.

FIG. 1 provides an illustration of a block diagram of a client-server architecture that is a geometric modelling of components representing different parts of real-world objects, according to an embodiment. The client-server architecture 100 includes a server 101, one or more client devices 107a-c, and a technical installation 108. The client device 107a-c may be, for example, a wearable device such as a head mounted display. The one or more client devices 107a-c and the technical installation 108 are connected to the server 101 via a network 105, for example, local area network (LAN), wide area network (WAN), WiFi, etc. In one embodiment, the server 101 is deployed in a cloud computing environment. As used herein, "cloud computing environment" refers to a processing environment including configurable computing physical and logical resources, for example, networks, servers, storage, applications, services, etc., and data distributed over the network 105, for example, the internet. The cloud computing environment provides on-demand network access to a shared pool of the configurable computing physical and logical resources. The server 101 may include a technical database 102 that includes sensor data obtained from one or more sensors deployed in the technical installation 108. The technical database 102 may also include event logs of the technical installation 108 and values associated with one or more parameters associated with the functioning of the technical installation 108. The server 101 may further include a situational awareness-based management module 103 that is configured to manage the technical installation 108. The server 101 may include an interface 104 that receives data, for example, sensor data from one or more sensors and transfers the sensor data to the technical database 102. Additionally, the interface 104 may also communicate with the client devices 107a-c and the technical installation 108 via the network 105.

The client device 107a-c is used by an entity to access data associated with the technical installation 108 to manage the technical installation 108. The data on the server 101 may be accessed by the entity via a graphical user interface of an end user web application.

Figure 2:
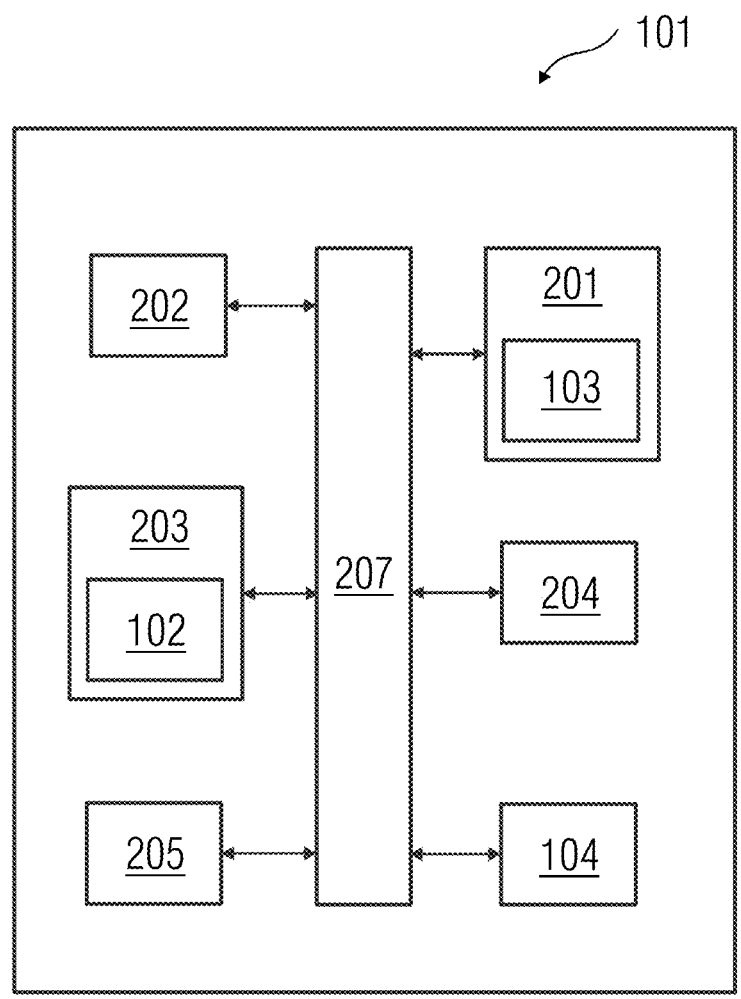
FIG. 2 depicts a block diagram of a system in which an embodiment of a method of managing a technical installation may be implemented.

FIG. 2 is a block diagram of a system 101 in which an embodiment may be implemented, for example, as a system to manage a technical installation, configured to perform the processes as described therein. It is appreciated that the server 101 is an exemplary implementation of the system in FIG. 1. In an embodiment, the system 101 may be a maintenance management system for the technical installation 108. In FIG. 2, the system 101 includes a memory 201, a processing unit 202, a storage unit 203, an input unit 204, an output unit 205 a network interface 104 and a standard interface or bus 206. The system 101 may be a (personal) computer, a workstation, a virtual machine running on host hardware, a microcontroller, or an integrated circuit. As an alternative, the system 101 may be a real or a virtual group of computers (the technical term for a real group of computers is "cluster", the technical term for a virtual group of computers is "cloud").

The processing unit 202, as used herein, includes any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 202 may also include embedded controllers, such as generic or programmable logic devices or arrays, application specific integrated circuits, single-chip computers, and the like. The processing unit 202 may include hardware elements and software elements. The processing unit 202 may be configured for multithreading, i.e. the processing unit 202 may host different calculation processes at the same time, executing the either in parallel or switching between active and passive calculation processes.

The memory 201 may be volatile memory and non-volatile memory. The memory 201 may be coupled for communication with the processing unit 202. The processing unit 202 may execute instructions and/or code stored in the memory 201. A variety of computer-readable storage media may be stored in and accessed from the memory 201. The memory 201 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 201 includes a situational awareness-based management module 103 stored in the form of machine-readable instructions on any of the above-mentioned storage media and may be in communication to and executed by processing unit 202. When executed by the processing unit 202, the management module 103 causes the processing unit 202 to manage a technical installation 108. Method steps executed by the processing unit 202 to achieve the abovementioned functionality are elaborated upon in detail in FIGS. 3-10.

The storage unit 203 may be a non-transitory storage medium that stores a technical database 102. The technical database 102 is a repository of information related to the technical installation 108. The input unit 204 may include inputs such as a keypad, a touch-sensitive display, a camera (such as a camera receiving gesture-based inputs), etc. that are configured to receive an input signal. The bus 206 acts as interconnect between the processing unit 202, the memory 201, the storage unit 203, the communication interface 104 the input unit 204 and the output unit 205.

Those of ordinary skilled in the art will appreciate that the hardware depicted in FIG. 2 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

A system 101 in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by an entity through a pointing device or touch based gestures or hand gestures. The position of the cursor may be changed and/or an event such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

Disclosed embodiments provide systems and methods for managing a technical installation. The systems and methods may perform maintenance of at least a portion of the technical installation.

Figure 3:
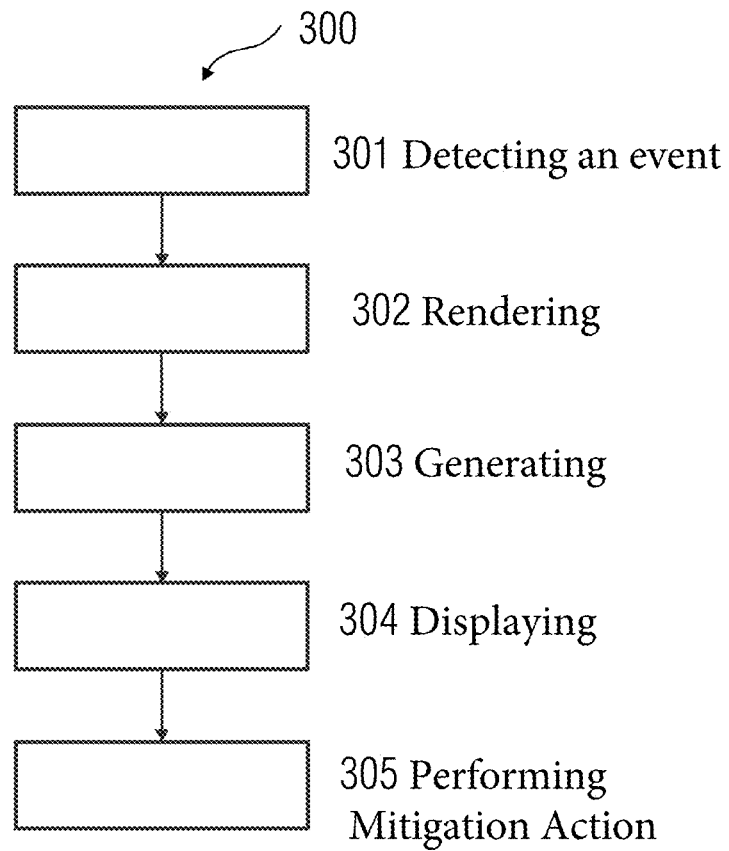
FIG. 3 depicts a flow chart of an embodiment of a method of managing a technical installation.
Figure 4:
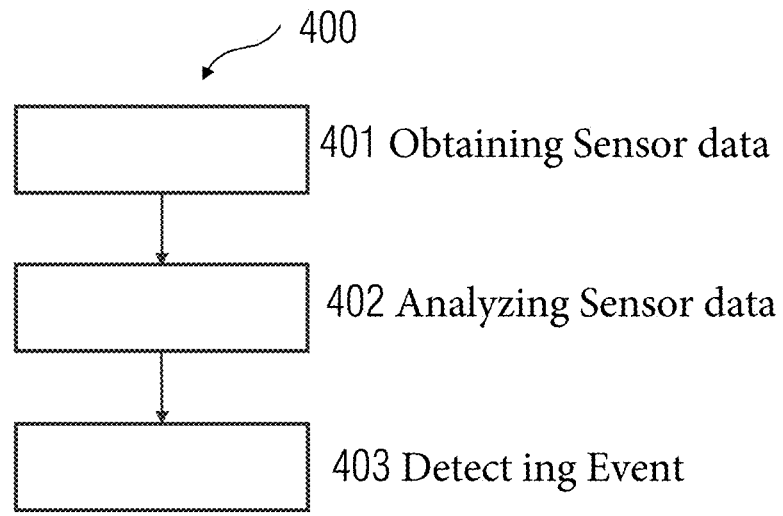
FIG. 4 depicts a flowchart of an embodiment of a method of detecting an event in a portion of the technical installation.
Figure 13:
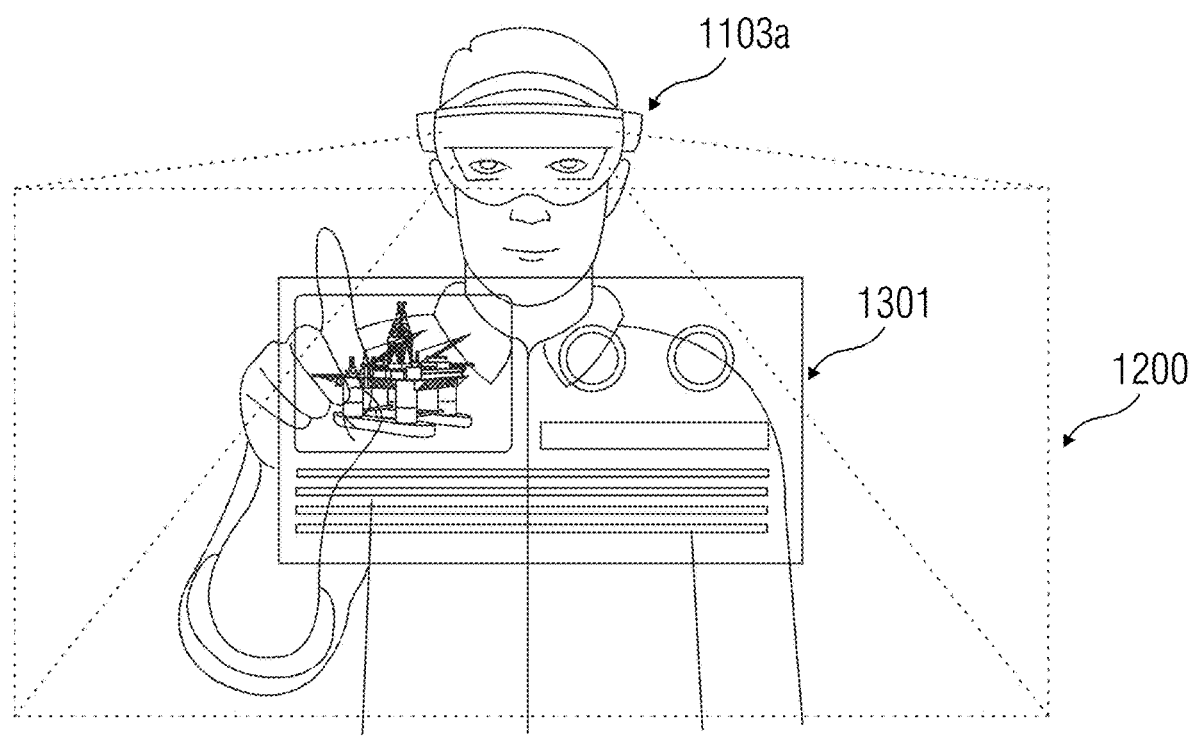
FIG. 13 depicts an embodiment of a graphical user interface providing a pictorial representation of an alert generated on a display unit of a wearable device.

FIG. 3 depicts a flowchart of an embodiment of a method 300 of managing a technical installation 108. The technical installation 108 may be remotely located, for example, in an offshore location. The technical installation 108 may be a complex industrial set-up with a plurality of units. Each unit of the plurality of units may function individually but in collaboration with other units so as to ensure efficient functioning of the technical installation 108. Therefore, breakdown of one of the units may lead to breakdown of the entire technical installation 108. Thus, awareness of the functioning of each unit is of utmost importance. Embodiments may be implemented as for example, but not limited to, a maintenance management system 101. The maintenance management system 101 may be configured to perform maintenance activities in the technical installation 108. The maintenance management system may be remotely located from the technical installation 108. In managing the technical installation, the method 300 includes a step 301 of detecting an event associated with a portion of the technical installation 108. An event may be an occurrence deviating from a standard, that requires attention of the entity for resolution. In an embodiment of the method, the event may be detected based on sensor data received from one or more sensors in the technical installation 108. The technical installation 108 may have one or more sensors to monitor one or more parameters associated with the functioning of the technical installation 108. The one or more parameters may be, for example, pressure, temperature and flow characteristics associated with at least a portion of the technical installation 108. An embodiment of a method of detecting the event in the technical installation 108 is illustrated in a flowchart in FIG. 4. At step 401, sensor data associated with the at least one portion of the technical installation is obtained from one or more sensors disposed in the technical installation. The one or more sensors are configured to interact with the at least one portion of the technical installation to capture data associated with one or more parameters of the technical installation 108. At step 402, the sensor data is analysed to identify an abnormality in the parameter values. A threshold for each parameter is identified. The threshold value may be pre-determined and may be retrieved from the technical database 102. The parameter values are compared with the threshold value to determine if at least one parameter value deviates from the threshold value. At step 403, an event is detected based on the deviation identified between the captured parameter values and the threshold values. In an embodiment, an alert may be generated on at least one wearable device when the event is detected. The alert may be displayed on the display unit of the wearable device 107a-c as a notification 1301. In an alternate embodiment, the notification 1301 may be displayed in conjunction with the representative view 1101 of the technical installation 108. FIG. 13 depicts an embodiment of a graphical user interface 1200 providing a pictorial representation of an alert generated on a display unit of a wearable device. The notification 1301 may be displayed on the display unit of the wearable device 107a-c such that it occupies a major portion of the display area. The area occupied by the notification 1301 may be increased or decreased depending upon the criticality of the information to be conveyed. Alternatively, the notification 1301 may be displayed in the peripheral area of the display unit of the wearable device such that the notification 1301 appears in the peripheral vision of the entity. In an embodiment, the notification 1301 may be indicated on the display unit using a different color to draw the attention of the entity associated with the wearable device 107a-c. In another embodiment, the notification 1301 may be generated in conjunction with a sound. In an embodiment, the alert may also include a pulse vibration in the wearable device, such that the wearable device 107a-c in pulses when an alert is generated.

Figure 11:
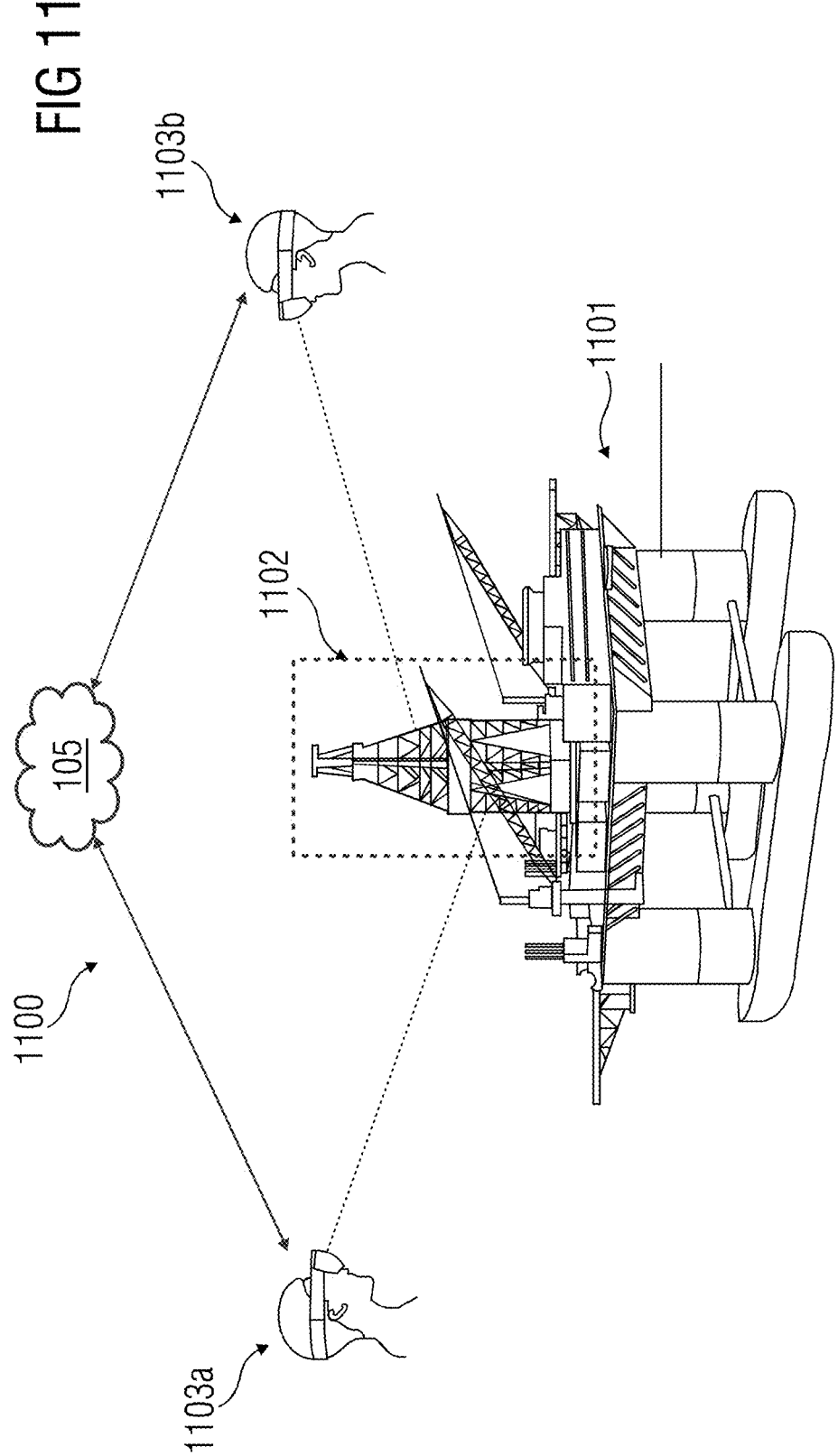
FIG. 11 depicts an embodiment of a representative view of a technical installation.

On detecting the event in the portion of the technical installation 108, at step 302 of the method 300, a representative view 1101 of the portion is rendered on the wearable device 107a-c associated with the entity. In an embodiment, the representative view of the technical installation is a multi-dimensional holographic view. The holographic view 1101 of the technical installation provides the entity to understand the location of the event in the technical installation 108. The holographic view of the portion of the technical installation 108 may be a miniature replica of the original portion of the technical installation 108. FIG. 11 depicts an embodiment of the holographic view 1101 of the technical installation 108. In the embodiment, the holographic view 1101 of the technical installation 108 is rendered as a multi-dimensional augmented reality view. Therefore, the real-world environment of the entity is augmented with information related to the technical installation 108. The holographic view 1101 may be overlaid as constructive sensory information such that the entity continues to be aware of his real-world environment. Alternatively, the holographic view 1101 may also be rendered as a virtual image on the display unit of the wearable device 107a-c. In an embodiment, the holographic view 1101 of the technical installation 108 may also highlight the portion 1102 of the technical installation 108 where the event is detected. The portion of the technical installation 108 may be distinguished, for example, with a different colour, by outlining the portion of the technical installation 108, or as a hologram in motion. A hologram in motion may depict the hologram with a pulsating motion, thereby drawing the attention of the entity to the portion where the event is detected. The holographic view 1101 may depict information associated with the detected event in conjunction with the multi-dimensional view of the technical installation 108. The information related to the detected event may include details associated with, but not limited to, the deviated parameters, criticality of the detected event and time of occurrence of the event. In an embodiment, the representative view 1101 of the technical installation 108 may remain stagnant such that the one or more entities may move around the representative view 1101. This provides the one or more entities to visualize the representative view 1101 from various directions and angles. Alternatively, the representative view 1101 may be turned in different directions and angles by one or more entities using, for example, hand gestures, or using a mouse drag.

Figure 5:
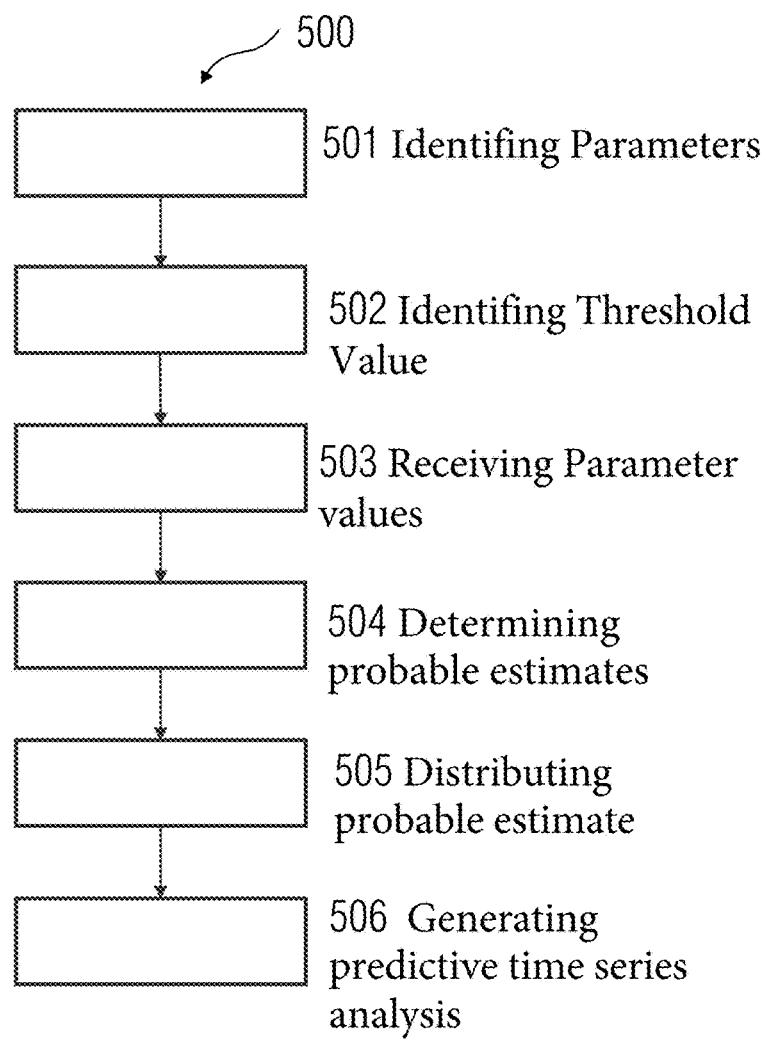
FIG. 5 depicts a flowchart of an embodiment of a method of generating a predictive time series analysis.

At step 303 of method 300, a predictive time series analysis of the sensor data associated with the detected event is generated. A predictive time series analysis provides the entity to determine how the event may progress over a period of time. Therefore, the criticality of the detected event is presented to the entity. This further provides the entity to take an informed and quick decision to resolve the detected event. FIG. 5 depicts a flowchart of a method 500 of generating the predictive time series analysis of the sensor data. At step 501, one or more parameters associated with the functioning of the portion of the technical installation are identified. At step 502, a threshold value for each of the one or more parameters is identified. The threshold value provides determination of the limit within which the values associated with the one or more parameters may lie. The sensors disposed in the portion of the technical installation capture the parameter values in real-time. The parameter values are received from the sensors, at step 503 through the interface 104. In an embodiment, the real-time sensor data may include a time stamp. The time stamp provides determination of the time of occurrence of the event in the portion of the technical installation. Based on the real-time values received from the sensors, one or more probable estimate values of the one or more parameters are determined at step 504 using a prediction model. The probable estimate values are distributed at regular time intervals at step 505 to generate the predictive time series analysis of the values associated with the parameters, at step 506. Predictive time series analysis provides the maintenance management system 101 to determine how soon the maintenance of the technical installation 108 may be required. Therefore, timely maintenance of the technical installation 108 is facilitated.

Figure 9:
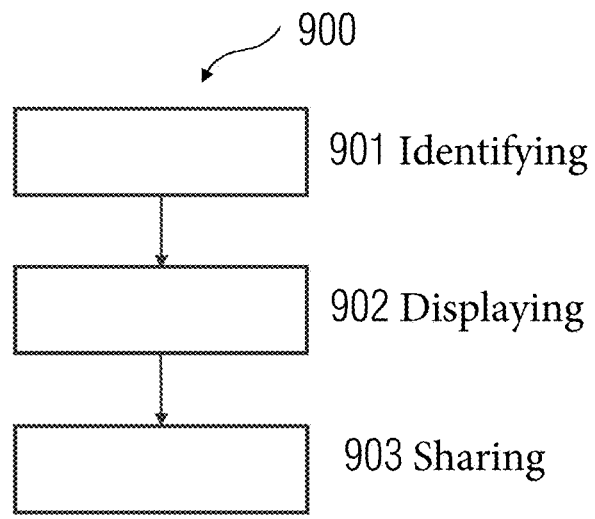
FIG. 9 depicts a flowchart of an additional embodiment of a method of managing a technical installation.
Figure 10:
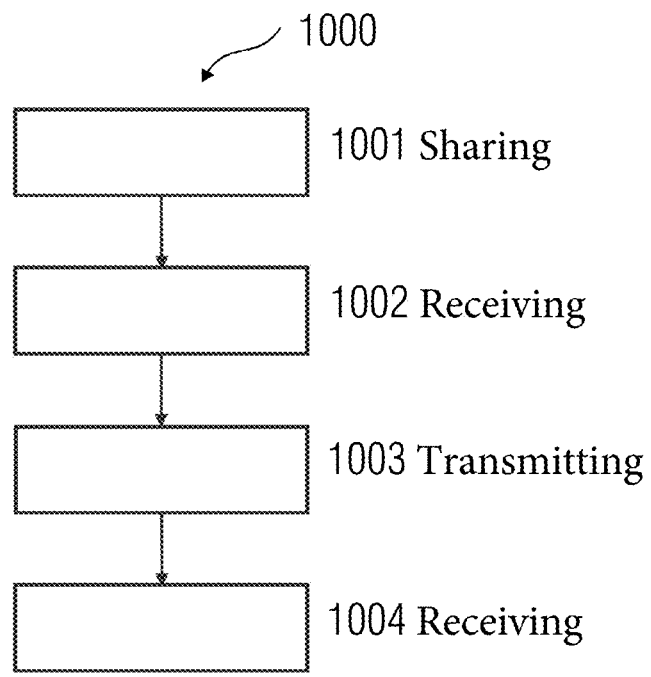
FIG. 10 depicts a flowchart of an embodiment of a method of managing a technical installation.

At step 304 of the method 300, the predictive time series analysis is displayed on the wearable device in conjunction with the representative view of the portion of the technical installation. In an embodiment of the method, a communication channel 1100 may be established between at least one of the wearable devices 107a and other wearable devices 107b-c of the entities associated with the technical installation 108. The communication channel 1100 provides transfer of information from one wearable device 107a of one entity to other wearable devices 107b-c of the other entities. FIG. 10 depicts a flowchart of an embodiment of the method 1000. The representative view 1101 and the predictive time series analysis of the parameter values may be shared by one entity to another through the connected wearable devices 107a-c via the communication channel 1100, at step 1001. The one or more entities with whom the representative view 1101 and the predictive time series analysis are to be shared may be determined using an escalation matrix. FIG. 9 depicts an embodiment of a method 900 of sharing the representative view 1101 and the predictive time series analysis with the one or more entities in the escalation matrix. At step 901, an escalation matrix associated with the detected event or anomaly is identified. The escalation matrix may be identified based on the nature of the detected event. Alternatively, the escalation matrix may also be identified based on the entities responsible for the portion of the technical installation 108 where the event is detected. The escalation matrix may include at least one entity to be reported about the detected event. The at least one entity may also be an individual who has an expertise in the domain corresponding to the at least one portion of the technical installation 108 and is configured to resolve the detected anomaly in the technical installation 108. On identification of the escalation matrix, the escalation matrix is displayed on the display unit of the wearable device 107a-c of the entity, at step 902. The representative view 1101 and the predictive time series analysis of the portion of the technical installation 108 is shared with the at least one entity included in the escalation matrix, on the wearable device 107a-c associated with the entity, at step 903.

At step 1002 of the method 1000, an input is received from a first entity 1103a of the one or more entities through the user interface of the wearable device 107a-c of the first entity 1103a. The input from the first entity 1103a may be, for example, but not limited to, touch based or gesture based. The input may be received via the user interface of the wearable device 107a-c. Alternatively, the input from the first entity 1103a may also be a voice-based input that may be received through a voice user interface in order to initiate a service or process in the system 101. At step 1003, the input provided by the first entity 1103a is transmitted in real-time to the connected wearable devices 107a-c of the remaining entities through the communication channel 1100. FIG. 11 depicts an embodiment of the representative view 1101 of the technical installation 108. In the embodiment, the holographic view 1101 of the technical installation 108 is viewed by the first entity 1103a and the second entity 1103b. In the embodiment, the gaze of the first entity 1103a is shared with the second entity 1103b and vice versa, so that both the entities 1103a, 1103b are aware of each other's point of view on the holographic view 1101. Therefore, if the first entity 1103a provides an input on the holographic view 1101 (or the portion of the holographic view 1102) of the technical installation 108, the input is transmitted to the wearable device second entity 1103b in real-time. Similarly, at step 1004, an input from the second entity 1103b may be received through the user interface of the wearable device, in response to the input from the first entity 1103a. In another embodiment, a conference session may be set up between the wearable devices 107a-c of the one or more entities 1103a, 1103b. The conference session facilitates efficient and quick sharing of information between different entities, thereby providing effective management of the technical installation 108. The conference session, may be, for example a telephonic call between the entities associated with the connected wearable devices 107a-c. Therefore, the one or more entities may participate in the call either via voice and video or only via voice. In an embodiment, the conference session may be secured by a security code or a personal identification number (PIN) such that only authorized entities may participate in the session. The conference session provides for participation of one or more entities present in different locations. Therefore, one or more entities may provide their inputs remotely.

Figure 12:
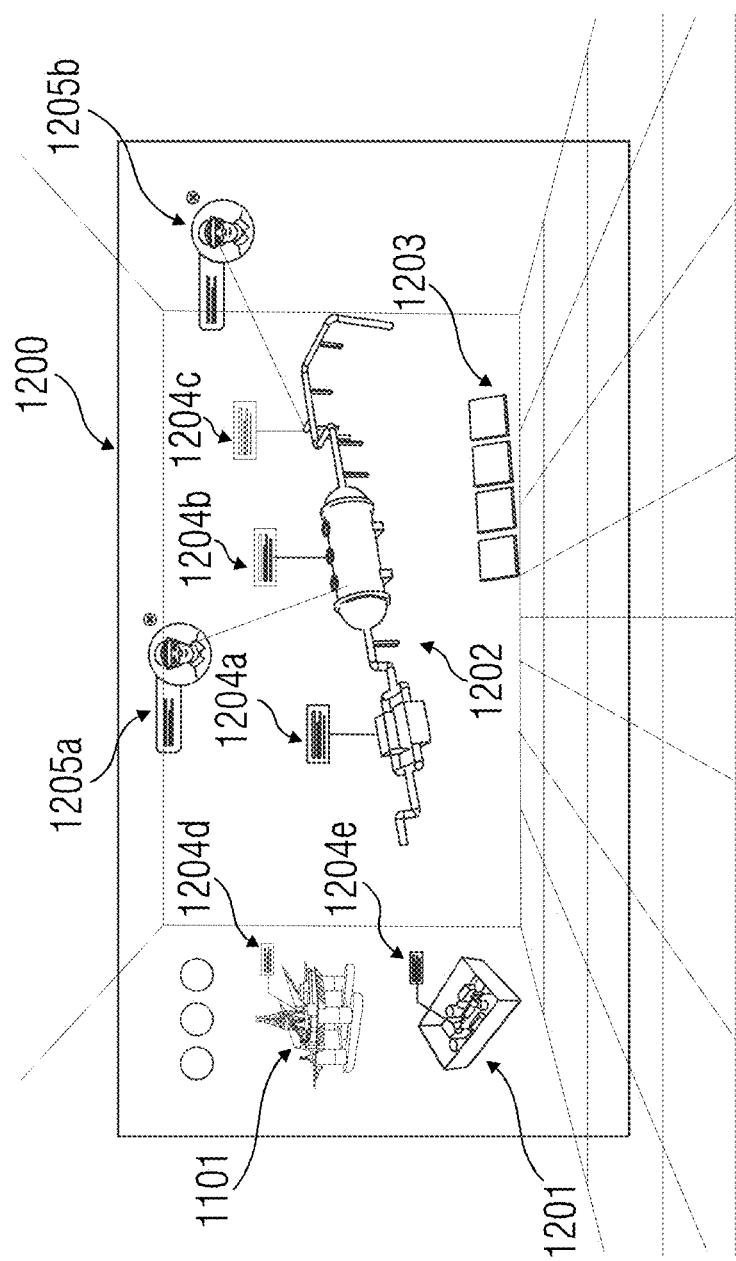
FIG. 12 depicts an embodiment of a graphical user interface in conjunction with a representative view of a portion of the technical installation.

FIG. 12 depicts an embodiment of a graphical user interface 1200 in conjunction with the representative view 1101 of a portion of the technical installation 108. The representative view 1101 of the technical installation 108 may be blown-up to provide a view of one or more units 1201, 1202 present inside the technical installation 108. The one or more entities may provide for the blown-up view of the technical installation 108 to obtain a detailed understanding of the units present in the portion of the technical installation 108. In another embodiment, a zoomed view of the technical installation 108 may also be generated. For example, in an embodiment, the first entity 1103*a* through an input may visualize the zoomed view of the technical installation 108, wherein the unit 1201 may be displayed. The one or more entities 1103*a*, 1103*b* may further zoom in to the unit 1201 to visualize specific components 1202 within the unit 1201. The zoomed view provides information on linked connections between one or more components in the units. In an embodiment, the representative views 1101, 1201, 1202 of the technical installation 108, the unit and the components within the unit may include one or more tool-tips 1204*a-e*. A tool-tip is a graphical user interface element containing information related to an associated item. For example, a tool-tip for the component 1202 may indicate the name of the component, the function of the component, one or more parameters associated with the component and an error message if the component is malfunctioning. In an embodiment, the tool-tip may not be shown unless a cursor is moved onto the item. Therefore, the tool-tip may be displayed only when a pointing device is hovered over the item. The tool-tip 1205*a-b* may also be present indicating information about one or more entities that are connected via the communication channel 1100. The graphical user interface 1200 may also include a manipulation toolbar 1203 that provides the one or more entities 1103*a*, 1103*b* to provide inputs on the representative views 1101, 1201, 1202 of the technical installation 108 and the units in the portion of the technical installation 108. In an embodiment, the manipulation toolbar 1203 may be active only for a single entity at a given point in time. Therefore, only a single entity may provide input at a given point in time. This prevents conflict between holograms.

Figure 6:
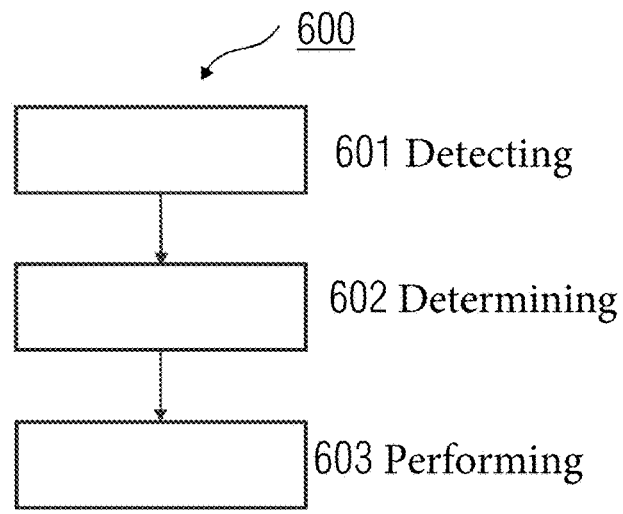
FIG. 6 depicts a flowchart of an embodiment of a method of performing a mitigation action to address the event.
Figure 7:
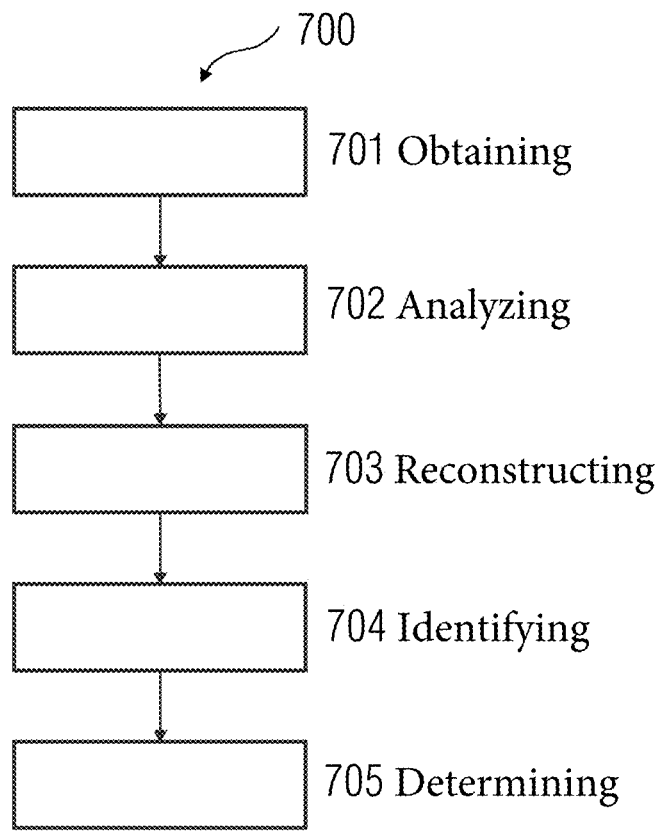
FIG. 7 depicts a flowchart of an embodiment of a method of determining mitigation action to resolve the detected anomaly.

The method 300 in FIG. 3 further includes a step 305 of performing at least one mitigation action to address the detected event in the portion of the technical installation 108 based on the predictive time series analysis. FIG. 6 depicts an embodiment of a method 600 of performing a mitigation action to address the detected event. The method 600 includes a step 601 of detecting an anomaly associated with the event in the portion of the technical installation 108. The anomaly may be detected based on the predictive time series analysis of the received parameter values. The predictive time series analysis provides an understanding of which parameter may have deviated from the standard or threshold, thereby causing the anomaly. At step 602, a mitigation action is determined to resolve the detected anomaly. FIG. 7 depicts a flowchart of an embodiment of a method 700 of determining the mitigation action to resolve the detected anomaly. At step 701, an event log associated with the technical installation 108 may be obtained from the technical database 102. The event log may pertain to the occurrences in the portion of the technical installation 108. The event log may include recordings related to significant events occurring in the technical installation 108 such as to errors, warnings, and informational messages. The event log may include a record of the time and date of occurrence of the event, type of event, source of the event and/or an event ID. At step 702, the event log is analyzed to determine of the nature and cause of the detected event. An event is reconstructed based on the event log to determine the cause of the malfunction or anomaly in the portion of the technical installation 108. The events in an event log may be stored chronologically and may be replayed in the same order to reconstruct the event, for example, in the form of a process history. The events may be reconstructed and represented on a map. For example, a map designer may be used to generate a map on which the event may be reconstructed. The map may be, for example, but not limited to, Cartesian map, timeline-based map, or a process model map. Based on the reconstructed event, one or mitigation actions are identified at step 704 that may have been used to address similar events in the same technical installation 108 or different technical installations of similar nature. Alternatively, if the detected event is unique and may not have been addressed before, a mitigation action is determined by identifying steps that may be taken to overcome the anomaly and reduce the impact of the malfunction of the technical installation 108. In an embodiment, the one or more identified mitigation actions may be shared with the one or more entities associated with the one or more wearable devices 107*a-c*, through the communication channel 1100. At 705, at least one mitigation action is determined from the identified mitigation actions to resolve the detected event.

Figure 8:
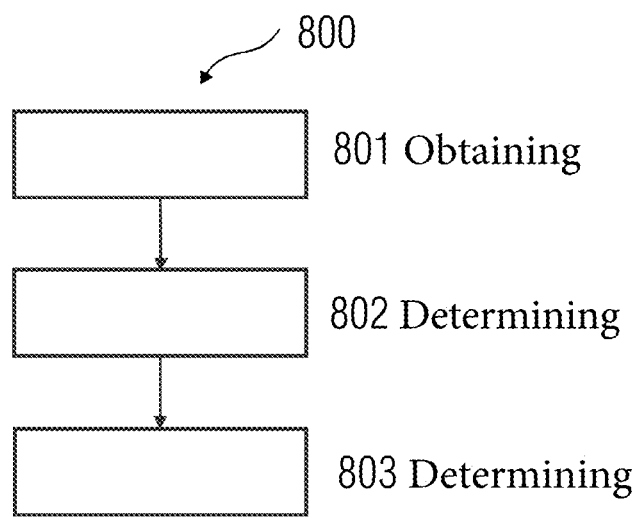
FIG. 8 depicts a flowchart of an embodiment of a method of determining the most appropriate mitigation action for resolving the detected anomaly.

FIG. 8 depicts a flowchart of an embodiment of a method of determining the most appropriate mitigation action to resolve the detected anomaly. At step 801, a predictive time series analysis data for each of the identified mitigated actions is obtained. In an embodiment, the predictive time series analysis data for each of the mitigation actions may be generated in a way similar to the predictive time series analysis for the detected event. The predictive time series analysis data for the mitigation actions provides the maintenance management system 101 to determine how the functioning of the technical installation 108 may change with time. Predictive time series analysis data may be generated by identifying one or more parameters that may be affected by the implementation of the mitigation action. Once the parameters are identified, a pre-defined threshold value for each of the parameters may be identified. In an embodiment, a prediction model may be used to determine probable estimate values of the parameters. The probable estimate values may be determined based on one or more factors associated with each of the mitigation actions. For example, if a successful implementation of a mitigation action depends on the effective functioning of another conjugated unit in the technical installation 108, the working status of the conjugated unit is determined. The probable estimate values may be distributed over a period of time to generate a predictive time series analysis data for each of the mitigation actions. At step 802, the outcome of each of the mitigation actions is determined by analyzing the predictive time series analysis data. For example, if the conjugated unit of the technical installation is non-functional, the outcome of the implementation of the mitigation action would be negative Implementation of the mitigation action may lead to a catastrophic disaster in the technical installation 108, or permanently damage the portion of the technical installation 108. Therefore, determining the outcome of each mitigation action provides the one or more entities 1103*a*, 1103*b* to take an informed decision for efficient maintenance of the technical installation 108. At step 803, a mitigation action with the most appropriate outcome in comparison to the other outcomes of the identified mitigation actions is determined to resolve the detected anomaly. On determination of the most appropriate mitigation action, at step 603 of method 600, the mitigation action may be performed in the portion of the technical installation 108 to resolve the detected anomaly.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method of managing a technical installation, the method comprising:
   receiving, by a processing unit, sensor data associated with at least one portion of the technical installation, from one or more sensors in the technical installation;
   detecting, by the processing unit, an event associated with the at least one portion of the technical installation based on the sensor data associated with the at least one portion of the technical installation, wherein a unit in the at least one portion of the technical installation is malfunctioning;
   rendering and displaying, by the processing unit, a representative holographic view of the at least one portion of the technical installation on at least one wearable device, wherein the representative holographic view of the technical installation is rendered as a multi-dimensional augmented reality view, wherein the representative holographic view of the technical installation highlights the portion of the technical installation where the event is detected, wherein the representative holographic view displays information comprising one or more parameters associated with a function of the at least one portion of the technical installation, wherein information related to the malfunctioning unit is overlaid on the representative holographic view;
   generating, by the processing unit, a predictive time series analysis of the sensor data associated with the detected event;
   determining, by the processing unit, an anomaly associated with the detected event in the at least one portion of the technical installation based on the predictive time series analysis of the received sensor data;
   identifying, by the processing unit, from an event log, one or more mitigation actions previously used for addressing an event which is similar to the detected event, in the same or a different technical installation;
   generating, by the processing unit, a set of predictive time series data for each of the identified one or more mitigation actions;
   generating, by the processing unit, an optimal mitigation action for resolving the detected anomaly associated with the at least one portion of the technical installation based on an analysis of the generated set of predictive time series data generated for each of the identified one or more mitigation actions;
   implementing the optimal mitigation action to resolve the anomaly in at least the portion of the technical installation; and
   displaying, by the processing unit, the predictive time series analysis in conjunction with the representative holographic view of the at least one portion of the technical installation.

2. The method of claim 1, wherein detecting the event in the portion of the technical installation comprises:
   analyzing the sensor data associated with the at least one portion of the technical installation; and
   detecting the event associated with the portion of the technical installation based on the analyzed sensor data.

3. The method of claim 2, wherein generating the predictive time series analysis of the sensor data comprises:
   identifying one or more parameters associated with a function of at least the portion of the technical installation;
   identifying a threshold value for each of the one or more parameters;
   receiving realtime values of the one or more parameters associated with the function of at least the portion of the technical installation from the one or more sensor units, wherein the values comprise a time stamp; and
   generating the predictive time series analysis associated with the detected event using the received realtime values.

4. The method of claim 3, wherein generating the predictive time series analysis comprises:
   determining one or more probable estimate values of the one or more parameters based on the realtime values received from the one or more sensors; and
   distributing the one or more probable estimate values of the one or more parameters at regular intervals of time to generate the predictive time series analysis.

5. The method of claim 1, wherein generating the optimal mitigation action to resolve the detected anomaly comprises:
   obtaining an event log associated with the technical installation from a technical database;
   analyzing the event log corresponding to the at least one portion of the technical installation; and
   reconstructing a prior event based on the event log to determine a cause of a malfunction in the portion of the technical installation.

6. The method of claim 5, wherein generating the optimal mitigation action for resolving the detected anomaly further comprises:
   determining an outcome of each mitigation action by analyzing the predictive time series analysis data for each of the identified one or more mitigation actions; and
   determining the optimal mitigation action with the most appropriate outcome in comparison to the other outcomes of the identified one or more mitigation actions to resolve the anomaly.

7. The method of claim 5, further comprising
   establishing a communication channel to connect the at least one wearable device and other wearable devices of one or more entities associated with the technical installation.

8. The method of claim 7, further comprising:
   identifying an appropriate escalation matrix associated with the detected anomaly, wherein the escalation matrix comprises at least one entity to be reported regarding the detected anomaly;

displaying the mitigation action and a corresponding escalation matrix on the at least one wearable device; and sharing the mitigation action and the corresponding escalation matrix by the at least one entity to the at least one wearable device of the at least one entity in the escalation matrix over the established communication channel.

9. The method of claim 1, further comprising setting up a conference session between wearable devices via a communication channel.

10. The method of claim 7, further comprising:

sharing the representative view and the predictive time series analysis of the portion of the technical installation with the wearable devices of one or more entities via the communication channel;

receiving an input from a first entity of the one or more entities through a user interface of the wearable device of the first entity;

transmitting the input provided by the first entity in realtime to the wearable devices of the remaining entities through the communication channel; and receiving an input from a second entity of the one or more entities through the user interface of the wearable device of the second entity in response to the input of the first entity.

11. The method of claim 1, further comprising generating an alert on the at least one wearable device when the event associated with the portion of the technical installation is detected.

12. A system comprising:

one or more servers remotely located from a technical installation;

one or more sensors communicatively coupled to the one or more servers; and one or more wearable devices communicatively coupled to the one or more servers, wherein the one or more servers comprise computer readable instructions, that when executed by the one or more servers cause the one or more servers to:

receive sensor data associated with at least one portion of the technical installation, from one or more sensors in the technical installation, wherein a unit in the at least one portion of the technical installation is malfunctioning;

detect an event associated with at least one portion of the technical installation based on the sensor data associated with the portion of the technical installation;

render a representative holographic view of the portion of the technical installation on the one or more wearable devices, wherein the representative holographic view of the technical installation is rendered as a multi-dimensional augmented reality view, wherein the representative holographic view highlights the portion of the technical installation where the event is detected, wherein information related to the malfunctioning unit is overlaid on the representative holographic view;

generate a predictive time series analysis of the sensor data associated with the detected event;

detect an anomaly associated with the detected event in the portion of the technical installation based on the predictive time series analysis of the received values;

identify from an event log, one or more mitigation actions previously used for addressing an event which is similar to the detected event, in the same or a different technical installation;

generate a set of predictive time series data for each of the identified one or more mitigation actions;

generate an optimal mitigation action for resolving the detected anomaly associated with the portion of the technical installation based on an analysis of the generated set of predictive time series data generated for each of the identified one or more mitigation action;

execute the optimal mitigation action to resolve the anomaly in at least the portion of the technical installation; and display the predictive time series analysis in conjunction with the representative holographic view of the at least one portion of the technical installation.

13. The system of claim 12, wherein the instructions to detect the event in the portion of the technical installation cause the one or more servers to:

receive the sensor data associated with the at least one portion of the technical installation from one or more sensor units disposed in the technical installation;

analyze the sensor data associated with the at least one portion of the technical installation; and detect the event associated with the portion of the technical installation based on the analyzed sensor data.

14. The system of claim 13, wherein the instructions to generate the predictive time series analysis of the sensor data cause the one or more servers to:

identify one or more parameters associated with a function the functioning of at least the portion of the technical installation;

identify a threshold value for each of the one or more parameters; receiving realtime values of the one or more parameters associated with the function functioning of at least the portion of the technical installation from the one or more sensor units, wherein the values comprise a time stamp; and generate the predictive time series analysis associated with the detected event using the received realtime values.

15. The system of claim 14, wherein the instructions to generate the predictive time series analysis cause the one or more servers to:

determine one or more probable estimate values of the one or more parameters based on the realtime values received from the one or more sensors; and distribute the one or more probable estimate values of the one or more parameters at regular intervals of time to generate the predictive time series analysis.

16. The system of claim 12, wherein the instructions to generate the optimal mitigation action to resolve the detected anomaly cause the one or more servers to:

obtain an event log associated with the technical installation from a technical database;

analyze the event log corresponding to the at least one portion of the technical installation; and reconstruct a prior event based on the event log to determine a cause of the malfunction in the portion of the technical installation.

17. The system of claim 12, wherein the instructions to generate the optimal mitigation action to resolve the detected anomaly further cause the one or more servers to:
   obtain a predictive time series analysis data for each of the identified one or more mitigation actions; and
   determine an outcome of each mitigation action by analyzing the predictive time series analysis data for each of the identified one or more mitigation actions.

* * * * *